UNITED STATES PATENT OFFICE.

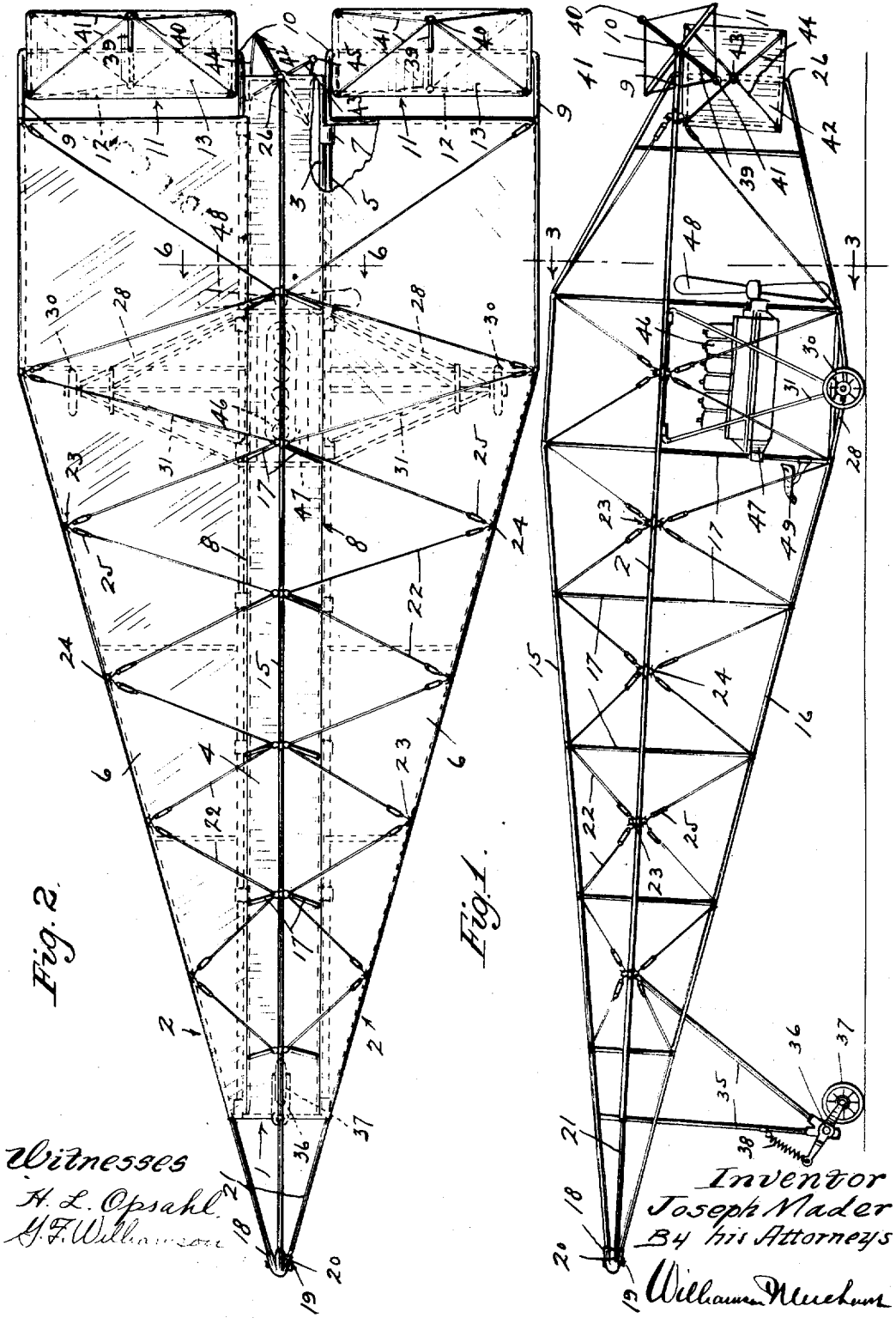

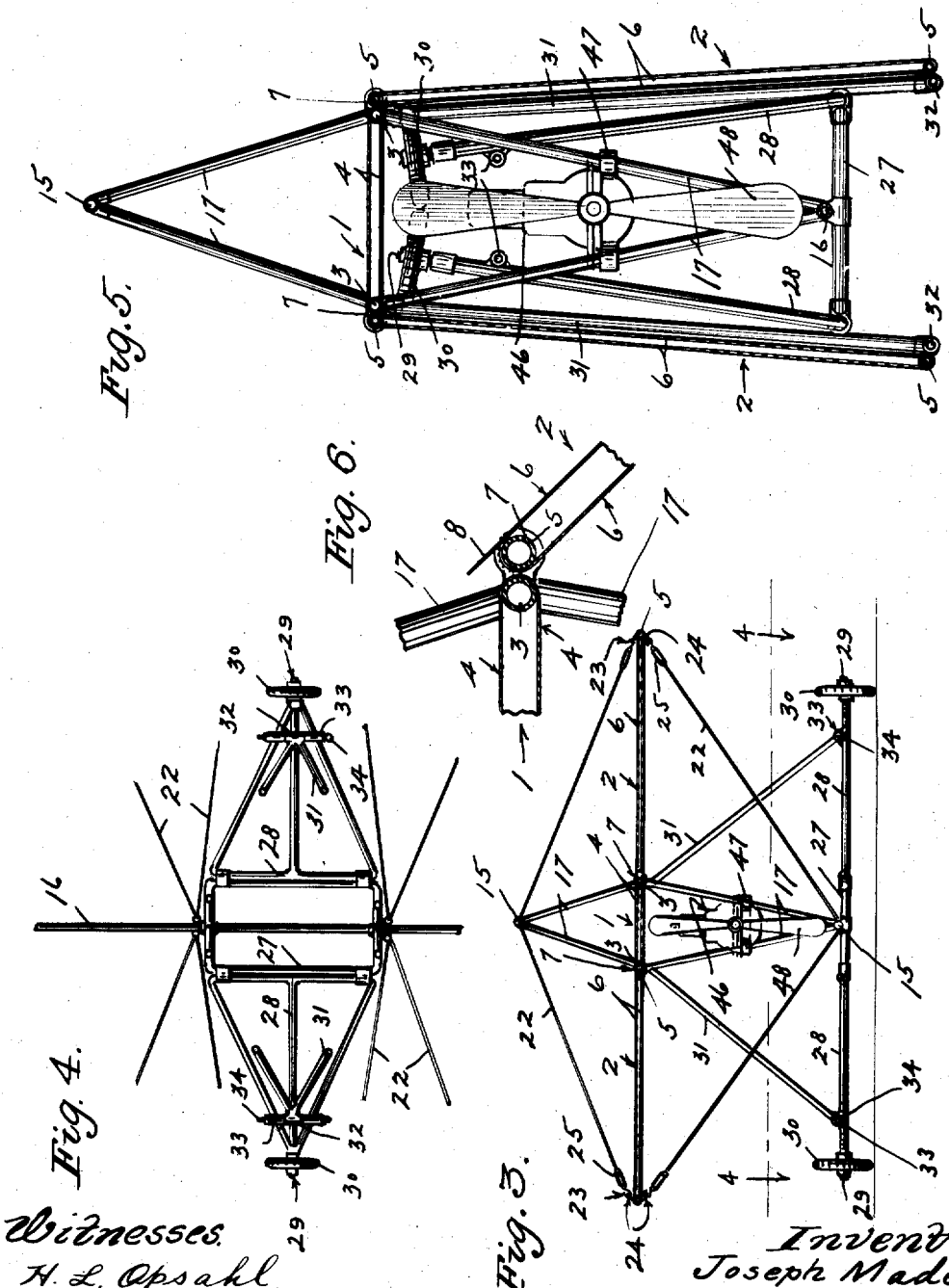

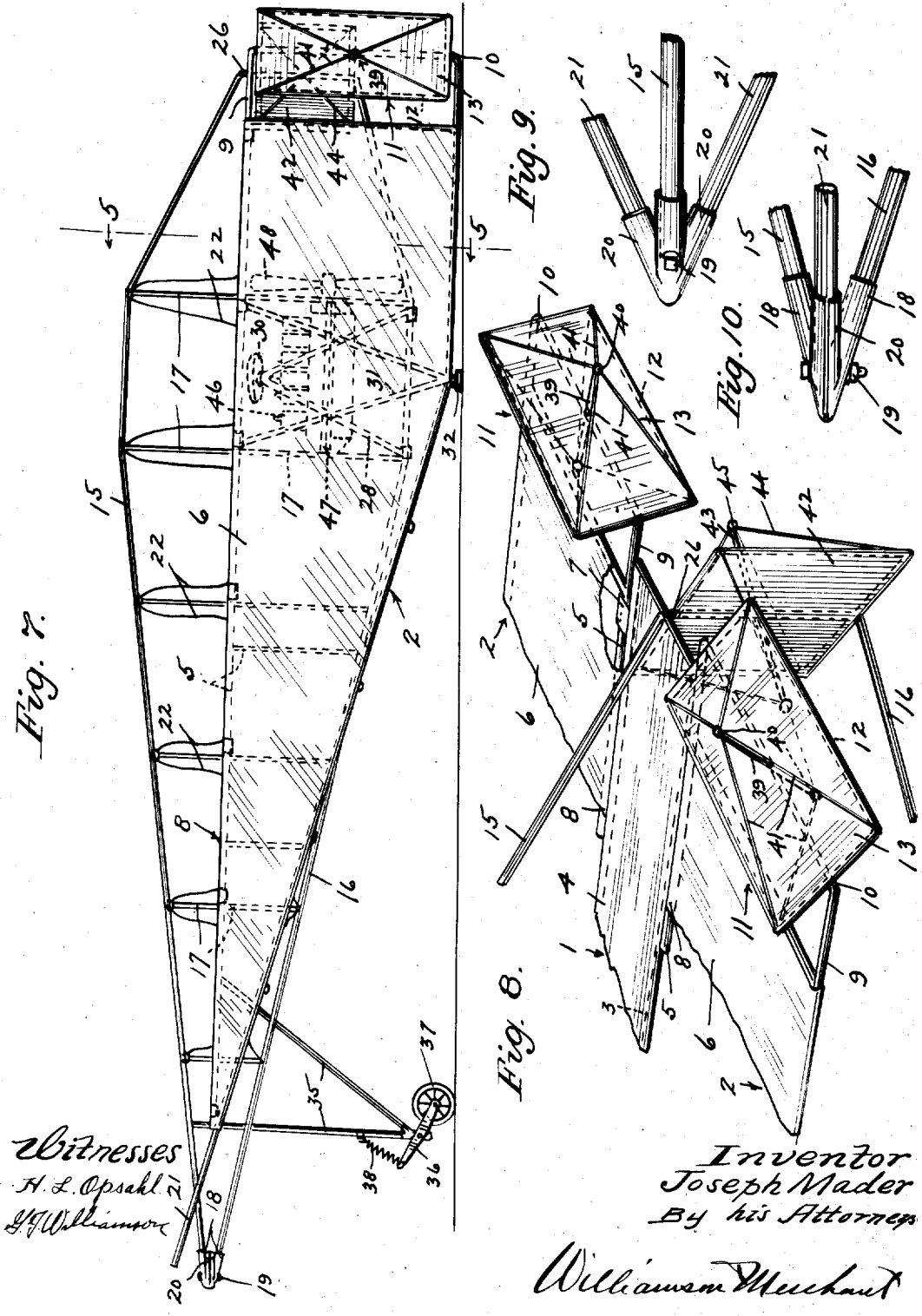

JOSEPH MADER, OF MINNEAPOLIS, MINNESOTA, ASSIGNOR OF ONE-THIRD TO MERRITT BRANDON, OF MINNEAPOLIS, MINNESOTA.

AEROPLANE.

1,256,812.                Specification of Letters Patent.     Patented Feb. 19, 1918.

Application filed August 17, 1916.   Serial No. 115,405.

*To all whom it may concern:*

Be it known that I, JOSEPH MADER, a citizen of the United States, residing at Minneapolis, in the county of Hennepin and State of Minnesota, have invented certain new and useful Improvements in Aeroplanes; and I do hereby declare the following to be a full, clear, and exact description of the invention, such as will enable others skilled in the art to which it appertains to make and use the same.

My invention has for its object to improve aeroplanes and particularly monoplanes; and, to this end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a side elevation of a monoplane constructed in accordance with my invention;

Fig. 2 is a plan view of the same;

Fig. 3 is a transverse section taken on the line 3—3— of Fig. 1;

Fig. 4 is a horizontal section taken on the line 4—4— of Fig. 3;

Fig. 5 is a vertical section taken on the line 5—5— of Fig. 7, on an enlarged scale;

Fig. 6 is a fragmentary detail view, principally in section, taken on the line 6—6—
of Fig. 2, on an enlarged scale, with the wing partly folded;

Fig. 7 is a view corresponding to Fig. 1, with the exception that the wings are folded;

Fig. 8 is a fragmentary perspective view of the rear end of the monoplane, on an enlarged scale;

Fig. 9 is a fragmentary detail view in plan of the front end of the monoplane; and Fig. 10 is a side elevation of the parts shown in Fig. 9.

The plane of the monoplane illustrated comprises a rectangular backbone member 1 and a pair of wings 2, and has a rectangular rear end portion and a forwardly tapered front end portion. The backbone member 1 is horizontally disposed and its frame 3 is preferably constructed of steel tubing and its body or covering is made up of two thicknesses of sheet metal or fabric, as desired. The covering 4 completely in-cases the frame 3 and affords smooth upper and lower surfaces, thus avoiding air pockets.

The wings 2 are preferably constructed in the same manner and of the same materials as the backbone member 1 and their frames and coverings are indicated, respectively, by the numerals 5 and 6. Hinge lugs 7 on the frame 3 pivotally receive the inner longitudinal members of the frames 5 of the wings 2 and foldably connect said wings to the backbone member 1, as best shown in Figs. 2 and 6. Joint strips 8 on the wings 2 overlap the backbone member 1, when said wings are open, and close the openings therebetween. The rear ends of the wings 2 terminate slightly forward of the rear end of the backbone member 1 and have formed with the frames 5 frame extensions 9, which project slightly rearward of the backbone member 1.

The frame extensions 9 are in the same planes with the wings 2 and their rear transverse members afford pivot rods 10 for elevators 11. These elevators 11 are intermediately pivoted to the rods 10, and preferably constructed in the same manner as the backbone member 1, and the frames and coverings therefor are indicated, respectively, by the numerals 12 and 13.

The backbone member 1 is located between upper and lower truss rods 15 and 16. These truss rods are extended longitudinally, with respect to the backbone member 1, and are located centrally, with respect to the transverse width thereof. Upper and lower pairs of struts 17 rigidly connect the backbone member 1 to the truss rods 15 and 16. The inner ends of the struts 17 are rigidly secured to the outer longitudinal edge portions of the backbone member 1 and the outer ends are brought together and rigidly connected to the truss rods 15 and 16.

Those portions of the truss rods 15 and 16, between the pairs of struts 17, located on opposite sides of a line drawn through the angles in the outer longitudinal edges of the wings 2, extend substantially parallel to each other and the backbone member 1. From the parallel portions of the truss rods 15 and 16, the same converge both forwardly and rearwardly. The front ends of the truss rods 15 and 16 meet forward of the plane and have rigidly secured thereto half brackets 18, detachably connected by a nut-equipped bolt 19. In the sides of the half brackets 18, are half sockets 20 arranged to receive and detachably hold, when the wings 2 are spread, the front ends of extensions 21 of the outer members of the frames 5 of said wings.

The wings 2 are rigidly held spread by cables 22 in trussed arrangement. These cables 22 are secured to the truss rods 15 and 16, at the junction of the struts 17 therewith, in oppositely diverging pairs and the outer ends of the cables of adjacent pairs are secured by hooks 23 to a common ring 24. These rings 24 are secured to the outer longitudinal edge portions of the wings 2. The connection between each cable 22 and its hook 23 is in the form of a turnbuckle 25 by which the cable can be placed under the desired tension. The rear ends of the truss rods 15 and 16 are rigidly connected by an upright rod 26, which is rigidly secured, at its junction with the truss rod 15, to the rear end of the backbone member 1.

A rectangular frame 27 is rigidly secured, at its intermediate portion, to the truss rod 16 and has hinged to its side members for vertical swinging movement a pair of wheel brackets 28. On the outer ends of these wheel brackets 28, is a pair of axially alined trunnions 29 on which is journaled a pair of landing wheels 30. These landing wheels 30 are located at the intermediate portion of the horizontal section of the truss rod 16. The wheel brackets 28 are releasably held in horizontal or operative positions by pairs of stay rods 31 hinged to the longitudinal edge portions of the backbone member 1 for vertical swinging movement transversely thereof. The outer ends of each pair of stay rods 31 are brought together and rigidly connected by a head 32. These heads 32 are adapted to be turned between pairs of lugs 33 on the outer end portions of the wheel brackets 28, when said wheel brackets are in operative position. The heads 32 are detachably secured to the lugs 33 by lock pins 34, adapted to be inserted through bores formed in said heads and lugs.

Depending and converging rods 35, rigidly secured to the front end portion of the backbone member 1, have their lower ends rigidly connected to afford a bearing for a wheel bracket 36 intermediately fulcrumed thereto. A landing wheel 37 is journaled on the rearwardly projecting end of the wheel bracket 36 and the front end thereof is held raised by a coiled spring 38, which yieldingly supports the wheel 37 from the foremost rod 35.

A controlling post 39 extends transversely and centrally through each elevator 11 and has in its ends eyes 40, through which controlling cables, not shown, may be attached.

Stay rods 41 connect the ends of the controlling post 39 to the four corners of the respective elevator 11. Also extended transversely and centrally through a rudder 42, intermediately pivoted on the rod 26 for horizontal swinging movement, is a controlling post 43. Stay rods 44 connect the ends of the controlling post 43 to the four corners of the rudder 42. Eyes 45 are formed in the ends of the controlling post 43 to receive controlling cables, not shown.

A motor, as shown, in the form of a multi-cylinder internal combustion engine, is diagrammatically illustrated and indicated as an entirety by the numeral 46. This motor 46 is located entirely below the plane 1—2, at the transverse center thereof, and extends both forward and rearward, with respect to the landing wheels 30. A bed 47 for the motor 46 is rigidly secured to the adjacent struts 17. A propeller 48 is keyed to the rear projecting end of the crank shaft of the motor 46. A seat 49 for the operator is supported, from certain of the struts 17, directly in front of the motor 46 and slightly below the same.

By constructing the plane with a tapered end, the same goes in the air more gradually, than a machine with a square end, but still maintains its lifting power. As the entire weight of the motor and operator is below the plane, inherent stability is given the aeroplane. The positioning of the motor and operator is also so arranged as to properly balance the aeroplane. When the aeroplane is at rest on the ground, substantially the entire weight thereof comes on the landing wheels 30 and the landing wheel 37 supports the front end of the aeroplane slightly inclined. The initial lifting movement of the aeroplane from the ground releases the weight on the landing wheel 37 and, at which time, the spring 38 contracts and, under the leverage action of the wheel bracket 36, throws the front end of the aeroplane into the air. This upward movement of the front end of the aeroplane, at the time the same is leaving the ground, is very desirable, as it assists in getting the aeroplane into the air.

By removing the pins 34 and unhooking the upper cables 22 from the rings 24, the landing wheels 30, stay rods 31 and wings 2 may be folded, as shown in Fig. 5. As the elevators 11 are carried by the wings 2, they are also folded, at the same time, onto the rudder 42. When the wings 2 are folded, the propeller 48 and motor 46 are incased by the plane, without having to dismantle the engine, thus making it an extremely simple matter to ship the aeroplane. It will also be noted that when the several parts of the aeroplane are folded, the heads 32 engage the ground and the stay rods 31 afford legs for supporting the intermediate portion of the aeroplane out of contact with the ground.

The mounting of the elevators 11, as shown, makes it possible to set the same in the same plane with the wings 2 or at different angles thereto. It also makes it possible to independently bank the elevators, when the aeroplane is turning a curve. In volplaning, the pointed end of the plane makes it easy to control the aeroplane.

What I claim is:—

1. An aeroplane having a plane comprising a trussed backbone member and wings hinged directly thereto for vertical folding movement, means for holding the wings spread, landing wheels foldably secured to the trusswork for the backbone member, and a motor secured to said trusswork, said motor and landing wheels when folded arranged to be incased by the plane when its wings are folded.

2. An aeroplane having a plane comprising a trussed backbone member and wings hinged directly thereto for vertical folding movement, means for holding the wings spread, a motor below the backbone member and secured to the trusswork therefor, and landing wheels secured to said trusswork and arranged to be folded onto the motor, said motor and landing wheels when folded arranged to be incased by the plane when its wings are folded.

3. An aeroplane having a plane comprising a backbone member and wings secured thereto for vertical folding movement, means for holding the wings spread, a rudder carried by the backbone member, and elevators mounted on the wings and arranged to be folded therewith and onto the rudder.

4. An aeroplane having a backbone member and wings foldably secured thereto, upper and lower longitudinal truss rods, struts connecting the truss rods to the backbone member, and means for securing the wings spread.

5. An aeroplane having a backbone member and wings foldably secured thereto, upper and lower longitudinal truss rods, oppositely converging struts connecting the backbone member to the truss rods, and cable connections between the truss rods and wings for holding said wings spread.

6. An aeroplane having a backbone member and wings foldably secured thereto, upper and lower longitudinal truss rods, oppositely converging struts connecting the truss rods to the backbone member, and cable connections in trussed arrangement between the truss rods and wings for holding said wings spread.

7. An aeroplane having a backbone member and forwardly tapered wings foldably secured thereto, upper and lower longitudinal truss rods, struts connecting the truss rods to the backbone member, and a bracket connecting the forward ends of the truss rods and wings.

8. An aeroplane having a backbone member and forwardly tapered wings foldably secured thereto, upper and lower longitudinal truss rods, struts connecting the truss rods to the backbone member, and a bracket rigidly connecting the front ends of the truss rods and detachably holding the front ends of the wings when spread.

9. An aeroplane having a plane comprising a backbone member and wings foldably secured thereto, the frames of said wings having rear end extensions, and elevators pivoted on the transverse portions of said rear end extensions with their pivots in the planes of the wings.

10. An aeroplane having a plane comprising a backbone member and wings foldably secured thereto, the frames of said wings having rear end extensions, elevators pivoted on the transverse portions of said rear end extensions with their pivots in the planes of the wings, and controlling posts secured to the elevators and extending on opposite sides thereof.

11. An aeroplane having a plane comprising a backbone member and wings foldably secured thereto, upper and lower longitudinal truss rods, a vertical rod connecting the rear ends of the truss rods, struts connecting the truss rods to the backbone member, and a rudder pivoted to said vertical rod.

12. An aeroplane having a plane comprising a backbone member and wings foldably secured thereto, upper and lower longitudinal truss rods, a vertical rod connecting the rear ends of the truss rods, struts connecting the truss rods to the backbone member, a rudder pivoted to said vertical rod, said wings having rear end extensions, and elevators pivoted on said rear end extensions with their pivots in the planes of the wings.

13. An aeroplane having a backbone member and wings secured thereto, means for holding the wings spread, a lower longitudinal truss rod, upwardly diverging struts connecting the truss rod to the backbone member, an engine having its bed located between said struts and provided with sleeves through which said struts project.

14. An aeroplane having a backbone member and wings with forwardly tapered portions hinged thereto for vertical folding movement, means for holding the wings spread, a lower longitudinal truss rod having an upwardly inclined forward end portion, and struts connecting the truss rod to the backbone member, the outer longitudinal edges of the forwardly tapered portions of the wings, when folded, being in substantially the same plane with the forwardly inclined portion of the truss rod.

15. An aeroplane having a backbone member and wings hinged thereto for vertical folding movement, means for holding the wings spread, a lower longitudinal truss rod, struts connecting the truss rod to the backbone member, landing wheel brackets foldably secured to the truss rod, landing wheels journaled on said brackets, and stay rods foldably secured to the backbone member for holding the wheel brackets in operative positions, said stay rods, when the wings and wheel brackets are folded, affording legs for supporting the aeroplane.

In testimony whereof I affix my signature in presence of two witnesses.

JOSEPH MADER.

Witnesses:
 HARRY D. KILGORE,
 C. F. KILGORE.

Copies of this patent may be obtained for five cents each, by addressing the "Commissioner of Patents, Washington, D. C."